United States Patent [19]
Glover

[11] 3,925,973
[45] Dec. 16, 1975

[54] FRUIT PICKING APPARATUS

[75] Inventor: George M. Glover, Merritt Island, Fla.

[73] Assignee: Caroline J. Starkey, Merritt Island, Fla.

[22] Filed: Nov. 19, 1974

[21] Appl. No.: 525,197

[52] U.S. Cl. .............................................. 56/328 R
[51] Int. Cl.² .......................................... A01D 46/24
[58] Field of Search .......................... 56/328 R, 332

[56] References Cited
UNITED STATES PATENTS

| | | | |
|---|---|---|---|
| 3,412,542 | 11/1968 | Kenton | 56/328 R |
| 3,413,786 | 12/1968 | Wehr | 56/328 R |
| 3,452,527 | 7/1969 | Steingas et al. | 56/328 R |

Primary Examiner—Louis G. Mancene
Assistant Examiner—Daniel J. Leach
Attorney, Agent, or Firm—Mason, Fenwick & Lawrence

[57] ABSTRACT

A hollow cylindrical housing encloses a spiral auger driven by a hydraulic motor with a fruit infeed opening provided in one end of the housing adjacent the spiral member and a fruit discharge outlet provided in the opposite end of the housing adjacent the spiral member. A stripper flange defines the outer edge portion of the spiral member adjacent the fruit infeed opening for engaging fruit and moving the fruit toward one edge of the fruit infeed opening defining an abutment so that continued rotation of the spiral member strips the fruit from the stem and moves the fruit for subsequent discharge through the discharge outlet.

11 Claims, 4 Drawing Figures

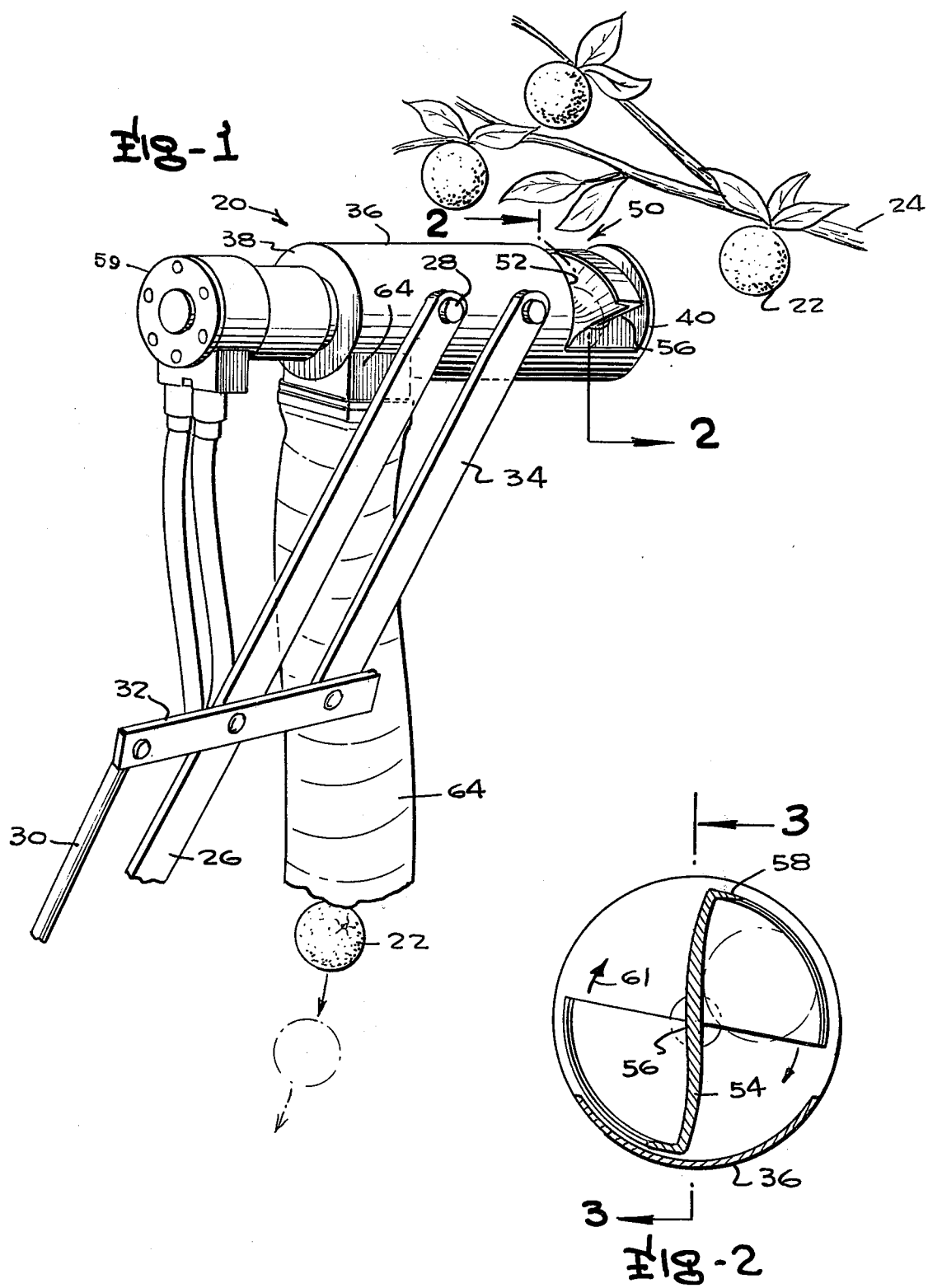

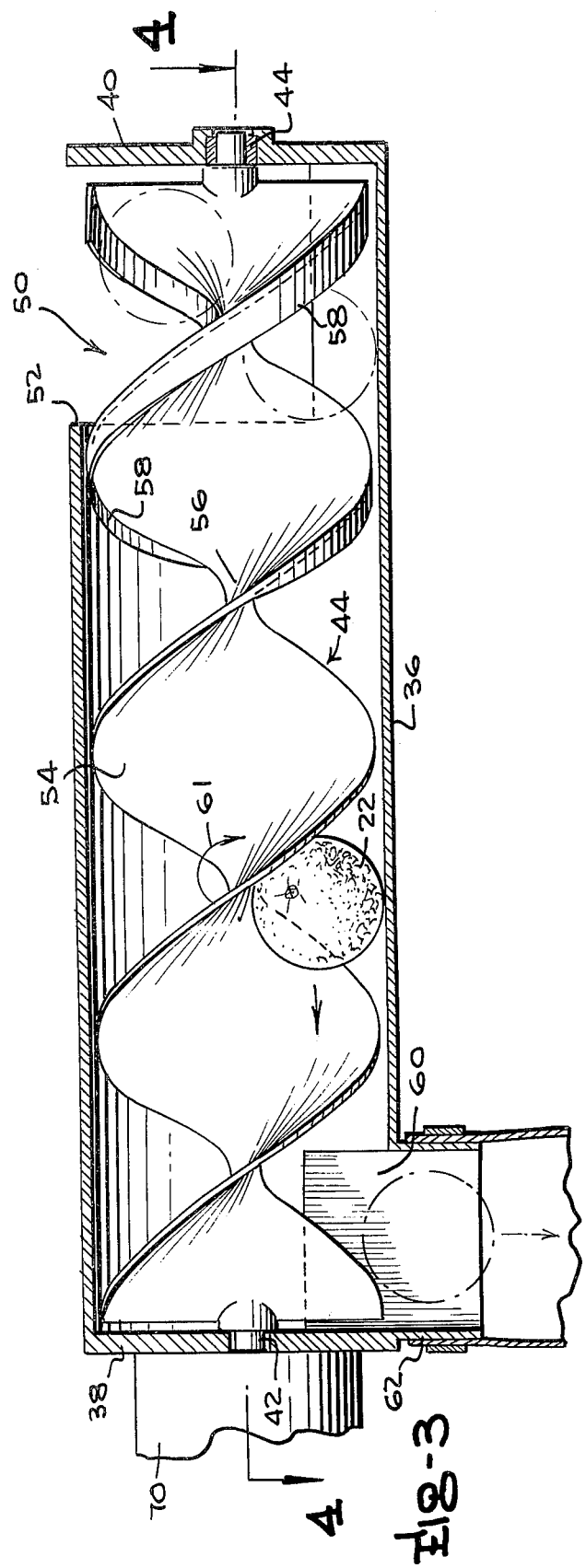
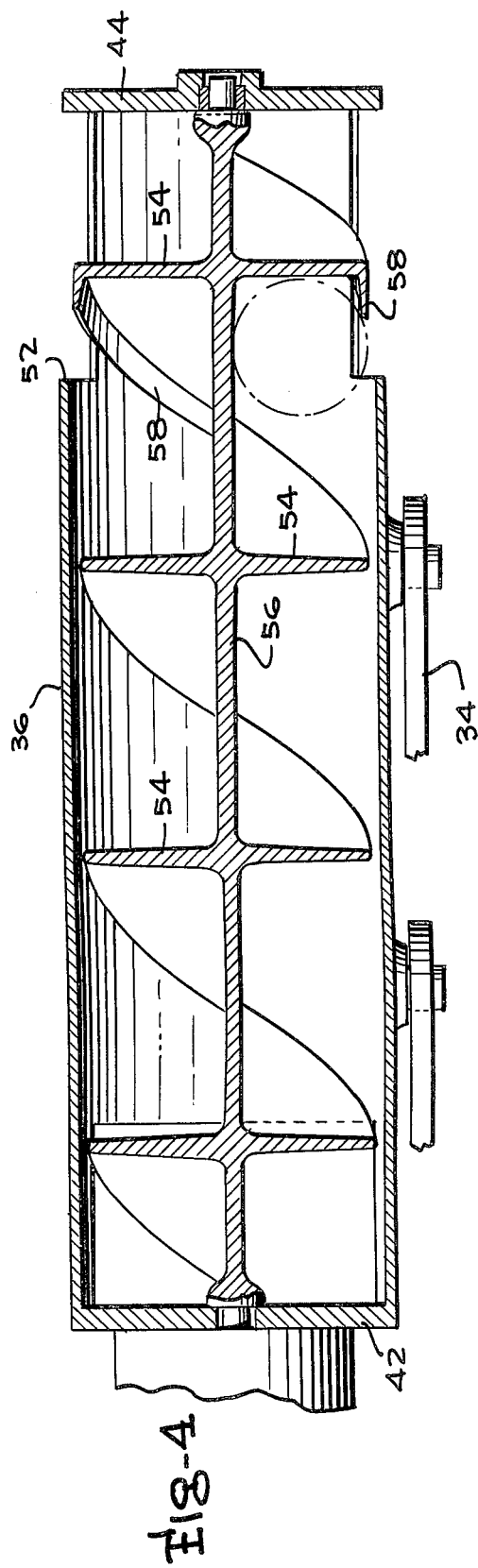

FRUIT PICKING APPARATUS

This invention is in the field of harvesting equipment and is more specifically directed to the field of fruit harvesting equipment for picking oranges, grapefruit, pears, apples and the like from trees or bushes on which the fruit is growing.

Labor shortages and the high cost of labor, when available, have resulted in numerous efforts to mechanize the process of harvesting tree-grown fruit in recent years. Unfortunately, the prior known devices have suffered from a number of disadvantages which have precluded their widespread adoption and usage notwithstanding the obvious desirability of mechanization as compared to the manual harvesting of fruit. For example, many of the prior known fruit picking devices have been overly complicated and have consequently been expensive to manufacture and maintain. Other devices do not provide satisfactory operation in that they bruise and adversely affect the fruit or fail to provide an efficient picking operation.

Therefore, it is the primary object of this invention to provide a new and improved fruit picking apparatus.

Another object of the subject invention is the provision of a new and improved fruit picking apparatus that is of simplified construction so as to be inexpensive to fabricate and maintain.

Yet another object of the invention is the provision of a new and improved fruit picking apparatus that can be mounted on a tractor or other device for operation.

Achievement of the foregoing objects is enabled by the preferred embodiment of the invention through the employment of a hollow cylindrical housing supported by a movable boom member or the like connected to a tractor or other supporting device or vehicle. The cylindrical housing is formed of a generally cylindrical envelope and two end walls with rotary bearing means being provided in the end walls in axial alignment with each other. A spiral auger type fruit engaging member is supported for rotation in the bearing members and is driven by a hydraulic motor. The cylindrical envelope of the housing includes an opening adjacent one end of the housing which provides an abutment extending in a plane transverse to the axis of rotation of the spiral member with the opening defining a fruit infeed opening by virtue of the fact that movement of the housing enables a positioning of fruit inwardly and through the opening to be engaged by the rotary spiral member. Engagement of the fruit with the spiral member serves to move the fruit and the stem supporting the fruit toward the abutment surface so that the fruit is eventually moved past and beneath the abutment surface to strip the fruit from the tree.

Additional aid for the stripping operation is effected by virtue of the fact that the outer periphery of the spiral member is defined by a stripper flange extending toward the abutment from a spiral web that is radially oriented with respect to the axis of rotation of the spiral member. The stripper flange aids in removal of the fruit which, upon removal from a tree, is conveyed to the opposite end of the housing by rotation of the spiral member from which it is discharged via a discharge outlet provided in the cylindrical envelope.

A better understanding of the preferred embodiment will be enabled when the following written description is considered in conjunction with the appended drawings in which:

FIG. 1 is a perspective view of the preferred embodiment as shown in conjunction with fruit on a tree to be harvested;

FIG. 2 is a sectional view taken along lines 2—2 of FIG. 1;

FIG. 3 is a sectional view taken along lines 3—3 of FIG. 2; and

FIG. 4 is a sectional view taken along lines 4—4 of FIG. 3.

Attention is invited to FIG. 1 of the drawings which illustrates a preferred embodiment of the invention, generally designated 20, in association with fruit 22 on a tree 24 for the harvesting of the fruit. The preferred embodiment is supported by a boom-like member 26 extending from a tractor or other suitable support with pivotal movement of the device about an axis 28 being effected by reciprocation of a control rod 30 which pivots a pivot lever 32 to move an actuator link 34 in an obvious manner.

The preferred embodiment 20 includes a housing formed of a generally cylindrical envelope 36 and first and second disc-shaped end walls 38 and 40. Rotary support bearings 42 and 44 are respectively provided in the first and second end walls 38 and 40 and provides support for a spiral auger member 44. The generally cylindrical envelope 36 also includes a fruit infeed opening 50 extending about a substantial portion of the end of the envelope adjacent the second end wall 40 as will be evident from inspection of FIGS. 3 and 4. An edge 52 of the fruit infeed opening 50 defines a fixed abutment which aids in the stripping of the fruit from the tree by rotation of the spiral auger member.

The spiral auger member 44 is of unitary construction and includes a radially extending web portion 54 which merges into an axial portion 56 extending between the bearing members 42 and 44. Additionally, a stripper flange 58 is provided on the end of the spiral member adjacent the fruit infeed opening 50 and extending toward the fixed abutment edge 52 as shown in FIG. 4. A hydraulic motor member 59 is drivingly connected to the spiral auger member 44 for rotating same in the direction of the arrow 61 in FIG. 3.

A fruit discharge outlet 60 is provided in the end of the generally cylindrical envelope 36 opposite the end in which the fruit infeed opening 50 is formed with a discharge conduit 62 extending from the outlet 60. A flexible cloth tube 64 is fixed to the discharge conduit 62 to convey the fruit to a receiving vehicle or the like.

In operation, the preferred embodiment 20 of the invention is positioned so that tree-supported fruit extends into the housing through opening 50 as shown in FIG. 3 and rotation of the auger moves the fruit to the left so that the supporting stem engages the fixed abutment 52 and continued rotation of the auger strips the fruit from the stem to convey the fruit along the length of the housing for discharge through the outlet 60 into the cloth tube 64 from which it is deposited in a wagon, box or other receptacle.

The operation performed on the fruit is remarkably gentle and neither bruises nor otherwise damages the fruit. Additionally, the subject invention can be employed for harvesting a wide variety of fruit ranging from cherries to grapefruit. Moreover, the device is remarkably rugged and simple and is consequently practically trouble-free.

Numerous modifications of the subject invention will undoubtedly occur to those of skill in the art, and it should be understood that the spirit and scope of the

I claim:

1. A fruit harvester for harvesting fruit from a tree comprising in combination, an elongated spiral member, support means supporting said elongated spiral member for rotation about its axis, means defining a fixed abutment extending transversely adjacent said elongated spiral member, drive means for drivingly rotating said elongated spiral member about its axis in direction so that positioning of an unharvested fruit member inwardly of the outer periphery of said spiral member between said spiral member and said fixed abutment results in movement of the fruit member past the fixed abutment to harvest the fruit member from the tree.

2. The invention of claim 1 wherein said support means comprises housing means having axially spaced rotary bearing members engaging shaft means extending axially of, and connected to, said elongated spiral member.

3. The invention of claim 1 wherein said support means comprises housing means having axially spaced rotary bearing members engaging shaft means extending axially from each end of said elongated spiral member, said housing including an inner surface defining an internal chamber substantially enclosing said spiral member and closely spaced from the outer surface of said spiral member, said housing further including means defining a fruit infeed opening radially adjacent one end of said spiral member and a portion of which comprises said fixed abutment and further including means defining a fruit discharge outlet radially adjacent said spiral member and axially spaced from said fruit infeed opening wherein said drive means rotates said spiral member in a direction to convey fruit in said housing from a position adjacent said fruit infeed opening to said fruit discharage outlet.

4. The invention of claim 3 wherein said spiral flange means includes a radial spiral web and a stripper flange portion extending perpendicular from the outer termination of said radial spiral web in the end of said spiral member adjacent said fruit infeed opening and in a direction toward said discharge outlet.

5. The invention of claim 4 additionally including movable support means connected to said housing for enabling desired positioning of said housing with respect to fruit on a tree.

6. The invention of claim 5 wherein said housing comprises a generally cylindrical casing and said internal chamber is of cylindrical shape and said spiral member is mounted for rotation about the axis of said cylindrical casing.

7. The invention of claim 6 wherein said drive means comprises a hydraulic motor.

8. The invention of claim 1 wherein said support means comprises a cylindrical housing means formed of a generally cylindrical sleeve and first and second parallel end walls, axially spaced and aligned bearing members mounted in said end walls, said elongated spiral member being supported for rotation by said bearing means and having its outer periphery closely adjacent the inner surface of said generally cylindrical sleeve wherein said fixed abutment comprises an edge of a fruit infeed opening provided in said generally cylindrical sleeve adjacent one end thereof, said edge extending in a plane transverse to the axis of rotation of said elongated spiral member and a downwardly facing fruit discharge outlet provided in said generally cylindrical sleeve axially spaced from said infeed opening so that rotation of said spiral member conveys fruit through said generally cylindrical sleeve from said fruit infeed opening to said fruit discharge outlet.

9. The invention of claim 8 wherein said spiral flange means includes a radial spiral web and a stripper flange portion extending perpendicular from the outer termination of said radial spiral web in the end of said spiral member adjacent said fruit infeed opening and in a direction toward said discharge outlet.

10. The invention of claim 9 additionally including movable support means connected to said housing for enabling desired positioning of said housing with respect to fruit on a tree.

11. The invention of claim 9 wherein said drive means comprises hydraulic motor means.

* * * * *

UNITED STATES PATENT AND TRADEMARK OFFICE
CERTIFICATE OF CORRECTION

PATENT NO. : 3,925,973
DATED : December 16, 1975
INVENTOR(S) : George M. Glover

It is certified that error appears in the above–identified patent and that said Letters Patent are hereby corrected as shown below:

On the front page, the designation of the assignee is changed to read: Caroline J. Starkey, Merritt Island, Florida, a part interest.

Signed and Sealed this

Twenty-first Day of November 1978

[SEAL]

Attest:

RUTH C. MASON
Attesting Officer

DONALD W. BANNER
Commissioner of Patents and Trademarks